United States Patent Office 3,836,549
Patented Sept. 17, 1974

3,836,549
ANTHRAQUINONE COMPOUNDS
Eiji Yamada, Ibaragi, Japan, assignor to Sumitomo
Chemical Company, Limited, Osaka, Japan
No Drawing. Filed May 11, 1971, Ser. No. 142,339
Claims priority, application Japan, May 16, 1970,
45/41,788; June 27, 1970, 45/56,306
Int. Cl. C09b 1/50
U.S. Cl. 260—380                    14 Claims

ABSTRACT OF THE DISCLOSURE

Anthraquinone compounds of the formula,

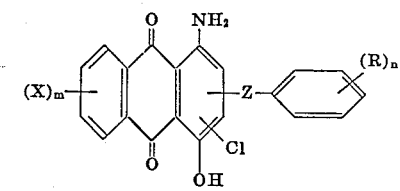

wherein Z is oxygen or sulfur, X is hydrogen or a halogen, R is hydrogen atom or a group which does not impart solubility in water, and $m$ and $n$ each signify an integer of 1 to 4, which are useful for dyeing synthetic articles brilliant red with good fastness, and are useful as intermediates for the production of anthraquinone disperse dyes, and which may be prepared by reacting an anthraquinone derivative represented by the formula,

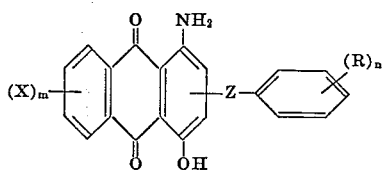

wherein R, X, Z, $m$ and $n$ are as defined above, with a chlorinating agent in the presence of a non-protonic polar solvent of an amide type.

This invention relates to novel anthraquinone compounds which are useful for dyeing synthetic articles, particularly synthetic fibrous and shaped articles made from polyesters, acetylcellulose, polyester ethers, polyurethanes or polyamides, and are useful as intermediates for the production of other anthraquinone dyes, a novel process for preparing the same and a process for dyeing said materials with the same.

The invention affords a novel anthraquinone compound represented by the formula,

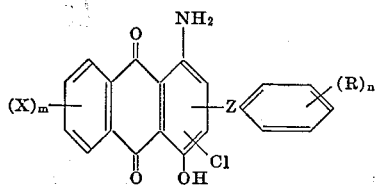

wherein Z is oxygen or sulfur atom, X is hydrogen or a halogen atom, R is hydrogen atom or a group which does not impart solubility in water, and $m$ and $n$ each signify an integer of 1 to 4, and a process for producing the anthraquinone compound of the formula (I), which comprises reacting an anthraquinone derivative represented by the formula,

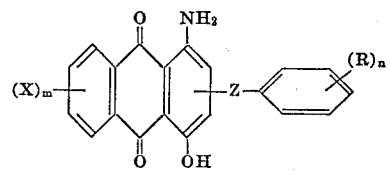

wherein R, X, Z, $m$ and $n$ are as defined above, with a chlorinating agent in a non-protonic polar solvent of an amide type.

As a result of extensive investigation on the halogenation of the anthraquinone derivative of the formula (II), the present inventor has found that solvents have a remarkable effect on the halogenation. It is known to react the derivative of the formula (II) with a halogenating agent in sulfuric acid, whereby the para-position of the benzene ring A as mentioned below is preferentially subjected to halogenation and successively the ortho-position thereof is subjected to halogenation,

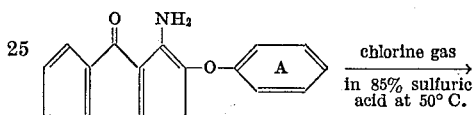

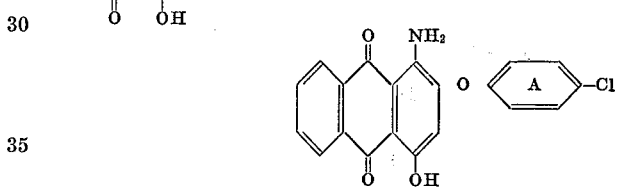

On the other hand, it has been surprisingly found the anthraquinone nucleus is selectively halogenated in the presence of a non-protonic polar solvent of an amide type instead of sulfuric acid, as follows,

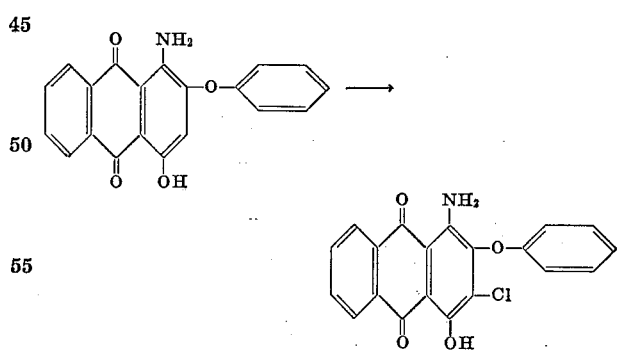

The present invention will be explained below in more detail.

Examples of the group, which does not impart solubility in water, and which is represented by R in the formula (I), are substituted or unsubstituted alkyl, alkoxy, phenoxy, phenylmercapto, phenylsulfonyl, phenylcarbonyl, alkylmercapto, alkylsulfonyl, alkylcarbonyl, alkylsulfonyloxy, phenylsulfonyloxy, alkylcarbonyloxy, phenylcarbonyloxy, phenoxysulfonyl, carboalkoxy, alkylaminosulfonyl, phenylaminosulfonyl or phenyl groups, or halogen atoms, nitro group or cyano group. In the present invention, "alkyl" means an alkyl having 1 to 5 carbon atoms.

The formula (II) representing an anthraquinone derivative which is a starting material in the present process is replaced by the following formula,
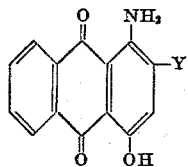
and examples of the group represented by Y are as follows:
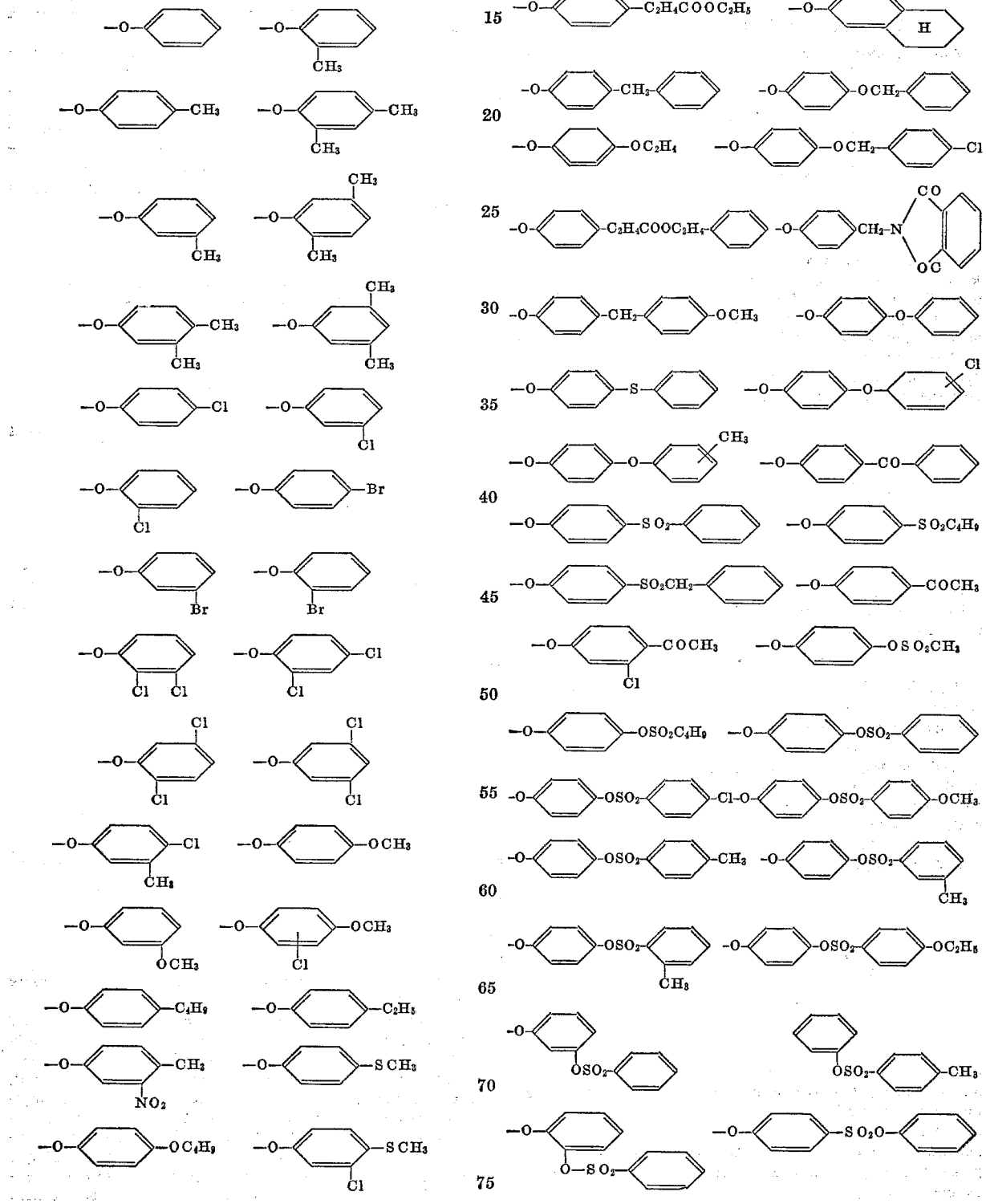

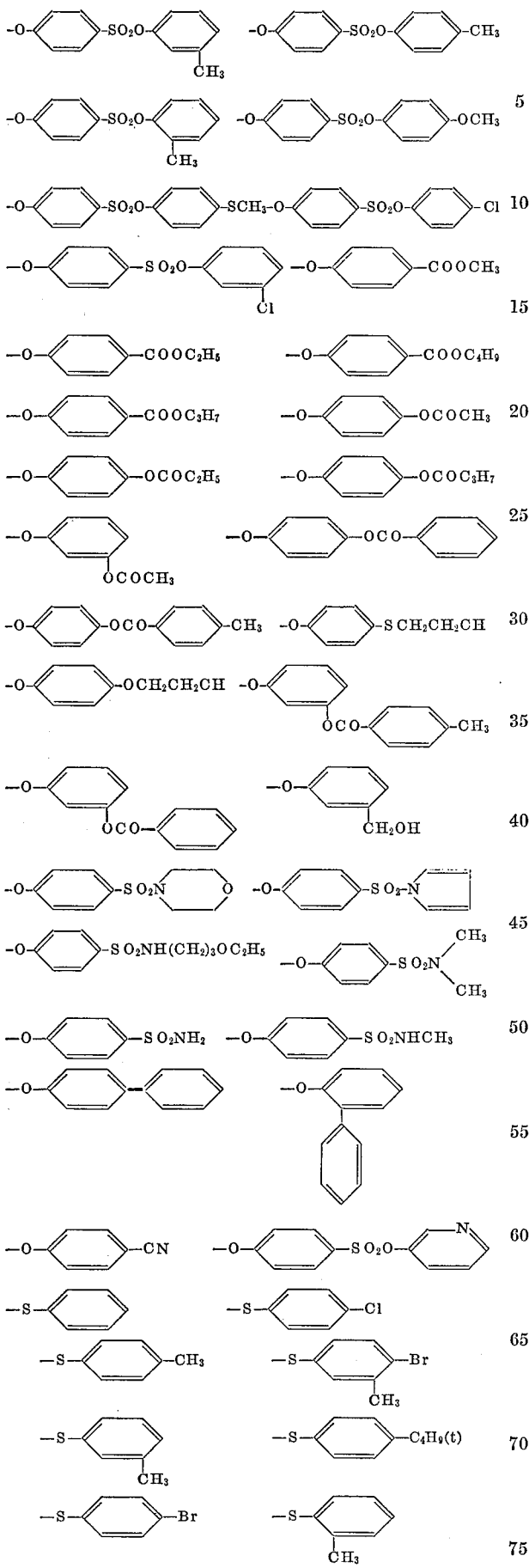

1-Amino-3-phenoxy- or phenylmercapto-4-hydroxy-anthraquinones, which are isomers of the above-mentioned 1-amino-2-phenoxy- or phenylmercapto-4-hydroxy-anthraquinones, and which are represented by the formulas,

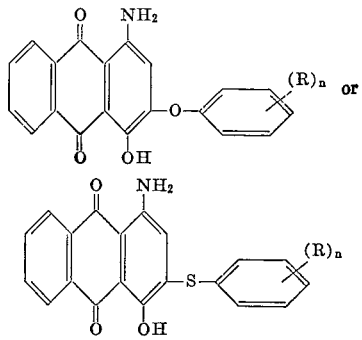

wherein R and $n$ are as defined above, may be also employed as the starting material. Further, there may be also employed the following anthraquinone derivatives which are substituted by a halogen in 5-, 6-, 7- or 8-position of the anthraquinone nucleus,

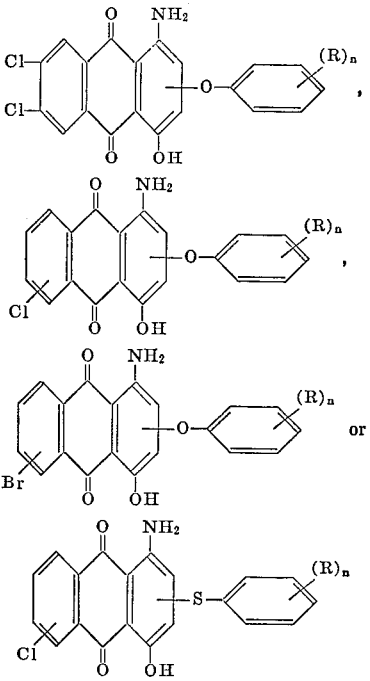

wherein R and $n$ are as defined above.

It is preferable to use sulfuryl chloride or chlorine gas as the chlorinating agent.

Preferable examples of the non-protonic polar solvent of an amide type include dimethylformamide, dimethylacetamide, N-methylpyrrolidone, diethylformamide and a mixture thereof. It is not always necessary to use the solvent mentioned above by itself, and the reaction may be conducted in a mixed solvent consisting of said solvent and such a neutral solvent inactive to chlorine as nitrobenzene, chlorobenzene, xylene, nitrotoluene and the like. In the present process, it is very important to use said amide type solvent. In case where other organic solvents such as pyridine, dimethyl sulfoxide, chlorobenzene, nitrobenzene and the like are used instead of said amide type solvent, no halogenation proceeds or remarkable side reaction occurs to fail to give the objective compounds.

In carrying out the present process, a small excess amount of the chlorinating agent is added dropwise or introduced gradually to the anthraquinone derivative of the formula (II) in the presence of said solvent at a temperature of 0° to 50° C. It is preferable to commence the introduction of the chlorinating agent at room temperature or below and to gradually introduce the chlorinating agent, because the reaction is exothermic. Although the reaction time depends on the kind of the starting anthraquinone derivative, particularly depends on the kind of substituent R in the formula (II), the reaction may be completed within 10 hours when the reaction is conducted at a temperature of 25° to 30° C. The chlorinating agent may be used in an amount of one to five mols per mol of the anthraquinone derivative of the formula (II). In case where it is difficult to complete the reaction, a relatively large amount of the chlorinating agent may be used. The reaction mixture, after the reaction is over, may be post-treated according to the conventional procedure in the production of conventional disperse dyes, whereby the objective compound may be recovered.

The present compound of the formula (I) thus obtained may be used not only for dyeing synthetic fibrous or shaped articles but also as an intermediate for the production of other anthraquinone dyes. The present compound of the formula (I) or a mixture thereof is suitable for dyeing synthetic fabrics, particularly polyester fabrics such as polyethylene terephthalate, cellulose triacetate and the like, and cellulose ester fabrics according to dip dyeing, printing or thermosol dyeing procedures. The present compounds may be useful for dyeing above-mentioned articles deeper tint with more excellent fastnesses, particularly fastness to washing after a resin-finishing, compared with those dyed with the anthraquinone derivative of the formula (II) or the above-mentioned compound in which the benzene ring A is substituted by chlorine.

In dyeing the fabrics, the present compound is dispersed in water using a suitable dispersing agent such as a condensate of naphthalenesulfonic acid and formaldehyde. The polyester fabrics may be dyed according to a high temperature dyeing method at 120° to 130° C., a carrier dyeing method at 100° C. or a thermosol dyeing method at 180° to 210° C., and the acetylcellulose and polyamide fabrics may be dyed at 80° to 100° C., or these fabrics may be printed with a paste containing the present compound dispersed, and the printed matter may be heat-treated, whereby a dyed fabric with excellent fastness may be obtained. Further, the present compound may be useful as a colorant for so-called dopedyeing, and for coloring various kinds of synthetic resin.

The present invention will be illustrated in more detail with reference to the following examples, which are, of course, not intended to limit the scope of the present invention. Parts and percent are by weight.

EXAMPLE 1

Into a mixture of 33 parts of dimethylformamide and 6.6 parts of 1-amino-2-phenoxy-4-hydroxyanthraquinone, 3.2 parts of sulfuryl chloride was added dropwise for about 2 hours with stirring at 25° C. During the dropwise addition of sulfuryl chloride, the temperature was raised to 28° to 30° C. because of exothermic reaction. The mixture was stirred for about one hour after the dropwise addition, and after disappearance of the starting material was confirmed according to the thin layer chromatography, a mixture of 16.5 parts of methanol and 16.5 parts of water was added gradually to the reaction mixture. The mixture was filtered to separate crystals, which were washed with methanol and water, and dried, whereby a novel dye having the formula,

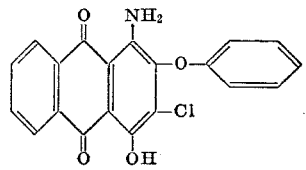

m.p.: 210° to 211° C.

was obtained.

Chlorine content: Calc'd: 9.70%. Found: 9.63%.

According to the same way as mentioned above except that 33 parts of dimethylacetamide or a mixture of 30 parts of nitrobenzene and 2.92 parts of dimethylformamide was used instead of dimethylformamide, the same dye as mentioned above was obtained.

The thus obtained dye may be useful for dyeing polyester fabrics brilliant bluish red with good fastness to light, sublimation and washing.

EXAMPLES 2–8

According to a similar manner to that of Example 1, the following results were obtained.

| | | | | Dye obtained | | |
|---|---|---|---|---|---|---|
| Ex. No. | Starting anthraquinone derivative and amount thereof (part) | Solvent and amount thereof (part) | Chlorinating agent and amount thereof (part) | Formula | M.P. (° C.) | Chlorine content calc'd/ (percent) found |
| 2 | 1-amino-2-p-chlorophenoxy-4-hydroxyanthraquinone (M.P.: 204° to 205° C.) (5.0). | Dimethylformamide (20). | Sulfuryl chloride (2.44). | (anthraquinone with NH₂, O–C₆H₄–Cl, Cl, OH substituents) | 215–217 | 17.7/17.4 |
| 3 | 1-amino-2-(3′-methylphenoxy)-4-hydroxyanthraquinone (6.9). | Dimethylformamide (27.6). | Sulfuryl chloride (3.7). | (anthraquinone with NH₂, O–C₆H₄–CH₃, Cl, OH substituents) | 185–188 | 9.34/9.80 |
| 4 | 1-amino-2-(4′-acetoxyphenoxy)-4-hydroxyanthraquinone (7.77). | Dimethylformamide (23.3). | Sulfuryl chloride (3.5). | (anthraquinone with NH₂, O–C₆H₄–OCOCH₃, Cl, OH substituents) | 225–227 | |

| Ex. No. | Starting anthraquinone derivative and amount thereof (part) | Solvent and amount thereof (part) | Chlorinating agent and amount thereof (part) | Dye obtained Formula | M.P. (°C.) | Chlorine content calc'd/ (percent) found |
|---|---|---|---|---|---|---|
| 5 | 1-amino-2-phenylmercapto-4-hydroxyanthraquinone (5.0). | Dimethylformamide (20). | Sulfuryl chloride (3.33). | 1-amino-2-(phenylthio)-3-chloro-4-hydroxyanthraquinone | 200–204 | 9.30/9.15 |
| 6 | 1-amino-2-(2',4'-dimethylphenoxy)-4-hydroxyanthraquinone (3.6). | Dimethylformamide (14.4). | Sulfuryl chloride (3.6). | 1-amino-2-(2',4'-dimethylphenoxy)-3-chloro-4-hydroxyanthraquinone | 213–221 | 9.05/8.97 |
| 7 | 1-amino-2-(4'-bromophenoxy)-4-hydroxyanthraquinone (5.0). | Dimethylformamide (30). | Sulfuryl chloride (2.48). | 1-amino-2-(4'-bromophenoxy)-3-chloro-4-hydroxyanthraquinone | 231–233 | 7.98/8.10 |
| 8 | 1-amino-2-(2'-methylphenoxy)-4-hydroxyanthraquinone (3.0). | Dimethylformamide (12). | Sulfuryl chloride (2.7). | 1-amino-2-(2'-methylphenoxy)-3-chloro-4-hydroxyanthraquinone | 215–217 | 9.33/9.12 |
| 9 | 1-amino-2-(4'-t-butylphenoxy)-4-hydroxyanthraquinone (7.74). | Dimethylformamide (31). | Sulfuryl chloride (3.24+2.6). | 1-amino-2-(4'-t-butylphenoxy)-3-chloro-4-hydroxyanthraquinone | 199–203 | 8.43/8.50 |
| 10 | 1-amino-2-(4'-cyanophenoxy)-4-hydroxyanthraquinone (5.0). | Dimethylformamide (30). | Sulfuryl chloride (6.0). | 1-amino-2-(4'-cyanophenoxy)-3-chloro-4-hydroxyanthraquinone | ---------- | 9.08/9.85 |
| 11 | 1-amino-2-(2',4'-dichlorophenoxy)-4-hydroxyanthraquinone (4.0). | Dimethylformamide (30). | Sulfuryl chloride (3.2). | 1-amino-2-(2',4'-dichlorophenoxy)-3-chloro-4-hydroxyanthraquinone | 228–231 | 24.5/23.8 |
| 12 | 1-amino-2-(3'-methylphenoxy)-4-hydroxyanthraquinone (6.9). | N-methylpyrrolidone (34.5). | Sulfuryl chloride (4.8). | 1-amino-2-(3'-methylphenoxy)-3-chloro-4-hydroxyanthraquinone | 186–188 | 9.34/9.31 |
| 13 | 1-amino-2-(4'-methoxyphenoxy)-4-hydroxyanthraquinone (5). | Dimethylformamide (20). | Sulfuryl chloride (3.74). | 1-amino-2-(4'-methoxyphenoxy)-3-chloro-4-hydroxyanthraquinone | 222–223 | ---------- |

| Ex. No. | Starting anthraquinone derivative and amount thereof (part) | Solvent and amount thereof (part) | Chlorinating agent and amount thereof (part) | Dye obtained Formula | M.P. (°C) | Chlorine content calc'd/ (percent) found |
|---|---|---|---|---|---|---|
| 14 | 1-amino-2-phenoxy-4-hydroxy-anthraquinone (6.6). | Dimethylformamide (33). | Chlorine gas was introduced until disappearance of the starting material was observed. | 1-amino-2-phenoxy-3-chloro-4-hydroxyanthraquinone | 210–211 | 9.70/9.63 |
| 15 | 1-amino-2-(4'-methylphenoxy)-4-hydroxyanthraquinone (5). | Dimethylformamide (20). | Sulfuryl chloride (3.7). | 1-amino-2-(4'-methylphenoxy)-3-chloro-4-hydroxyanthraquinone | 205–207 | — |

According to the manner similar to those in above mentioned Examples, the following novel compounds were obtained.

Y in the following formula, 1-amino-2-Y-3-chloro-4-hydroxyanthraquinone

| Ex. No. | Y | Shade on polyester fabrics |
|---|---|---|
| 16 | —O—C$_6$H$_3$(Cl)(CH$_3$) | Bluish red. |
| 17 | —O—C$_6$H$_3$(CH$_3$)(CH$_3$) | Do. |
| 18 | —O—C$_6$H$_3$(CH$_3$)(CH$_3$) | Do. |
| 19 | —O—C$_6$H$_3$(CH$_3$)(CH$_3$) | Do. |
| 20 | —O—C$_6$H$_3$(Cl)(Cl) | Do. |
| 21 | —O—C$_6$H$_3$(OCH$_3$)(Cl) | Do. |
| 22 | —O—C$_6$H$_4$—C$_5$H$_{11}$(t) | Do. |
| 23 | —O—C$_6$H$_4$—C$_2$H$_5$ | Do. |
| 24 | —O—C$_6$H$_4$—SCH$_3$ | Do. |
| 25 | —O—C$_6$H$_3$(SCH$_3$)(Cl) | Do. |
| 26 | —O—C$_6$H$_3$(CH$_3$)(Cl)(CH$_3$) | Bluish red. |
| 27 | —O—C$_6$H$_4$—CH$_2$Cl | Do. |
| 28 | —O—C$_6$H$_4$—C$_2$H$_4$CN | Do. |
| 29 | —O—C$_6$H$_4$—C$_2$H$_4$COOC$_2$H$_5$ | Do. |
| 30 | —O—C$_6$H$_4$—CH$_2$—C$_6$H$_5$ | Do. |
| 31 | —O—C$_{10}$H$_7$ | Do. |
| 32 | —O—C$_6$H$_4$—OCH$_2$—C$_6$H$_5$ | Do. |
| 33 | —O—C$_6$H$_4$—CH$_2$—C$_6$H$_4$—OCH$_3$ | Do. |
| 34 | —O—C$_6$H$_4$—O—C$_6$H$_5$ | Do. |
| 35 | —O—C$_6$H$_4$—O—C$_6$H$_4$—Cl | Do. |
| 36 | —O—C$_6$H$_4$—O—C$_6$H$_4$—CH$_3$ | Do. |
| 37 | —O—C$_6$H$_4$—S—C$_6$H$_5$ | Do. |
| 38 | —O—C$_6$H$_4$—CH$_2$N(CO)$_2$C$_6$H$_4$ (phthalimido) | Do. |
| 39 | —O—C$_6$H$_4$—SO$_2$—C$_6$H$_5$ | Do. |
| 40 | —O—C$_6$H$_4$—CO—C$_6$H$_5$ | Do. |
| 41 | —O—C$_6$H$_4$—SO$_2$C$_4$H$_9$(n) | Do. |
| 42 | —O—C$_6$H$_4$—SO$_2$CH$_2$—C$_6$H$_5$ | Do. |

Y in the following formula, $$\text{anthraquinone with } NH_2, Y, Cl, OH \text{ substituents}$$

| Ex. No. | Y | Shade on polyester fabrics |
|---|---|---|
| 43 | —O—C₆H₄—COCH₃ | Bluish red. |
| 44 | —O—C₆H₄—OSO₂CH₃ | Do. |
| 45 | —O—C₆H₄—OSO₂—C₆H₅ | Do. |
| 46 | —O—C₆H₄—OSO₂—C₆H₄—Cl | Do. |
| 47 | —O—C₆H₄—OSO₂—C₆H₄—OCH₃ | Do. |
| 48 | —O—C₆H₄—OSO₂—C₆H₄—CH₃ | Do. |
| 49 | —O—C₆H₄—OSO₂—C₆H₄(CH₃) (meta) | Do. |
| 50 | —O—C₆H₄—OSO₂—C₆H₄(CH₃) | Do. |
| 51 | —O—C₆H₄(OSO₂—C₆H₅) | Do. |
| 52 | —O—C₆H₄—SO₂O—C₆H₅ | Do. |
| 53 | —O—C₆H₄—SO₂O—C₆H₄—CH₃ | Do. |
| 54 | —O—C₆H₄—SO₂O—C₆H₄—OCH₃ | Do. |
| 55 | —O—C₆H₄—SO₂O—C₆H₄—SCH₃ | Do. |
| 56 | —O—C₆H₄—SO₂O—C₆H₄—Cl | Do. |
| 57 | —O—C₆H₄—COOCH₃ | Do. |
| 58 | —O—C₆H₄—COOC₂H₅ | Do. |
| 59 | —O—C₆H₃(Cl)—OCOCH₃ | Do. |
| 60 | —O—C₆H₄—OCOC₂H₅ | Do. |
| 61 | —O—C₆H₄—OCOC₃H₇ | Do. |
| 62 | —O—C₆H₄—OCO—C₆H₅ | Bluish red. |
| 63 | —O—C₆H₄(OCOCH₃) | Do. |
| 64 | —O—C₆H₄(OCO—C₆H₅) | Do. |
| 65 | —O—C₆H₄(OCO—C₆H₄—CH₃) | Do. |
| 66 | —O—C₆H₄—SO₂N(morpholine) | Do. |
| 67 | —O—C₆H₄—SO₂N(CH₃)₂ | Do. |
| 68 | —O—C₆H₄—SO₂NH—(CH₂)₃OC₂H₅ | Do. |
| 69 | —O—C₆H₄—SO₂NHCH₃ | Do. |
| 70 | —O—C₆H₄—C₆H₅ | Do. |
| 71 | —O—C₆H₄—SO₂O—pyridyl | Do. |
| 72 | —S—C₆H₅ | Do. |
| 73 | —S—C₆H₄—CH₃ | Do. |
| 74 | —S—C₆H₄—Cl | Do. |
| 75 | —S—C₆H₃(CH₃)—Br | Do. |
| 76 | —S—C₆H₄—C₄H₉(t) | Do. |
| 77 | —S—C₆H₄—Br | Do. |
| 78 | —S—C₆H₄(CH₃) | Do. |

| Ex. No. | Formula of the dye | Shade on polyester fabrics |
|---|---|---|
| 79 | 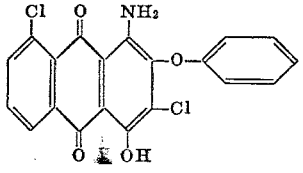 | Bluish red. |
| 80 | 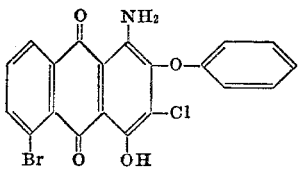 | Do. |
| 81 | 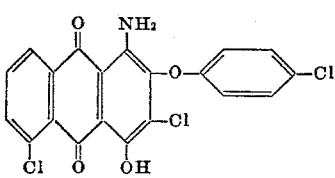 | Do. |
| 82 | 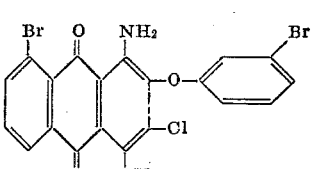 | Do. |
| 83 | 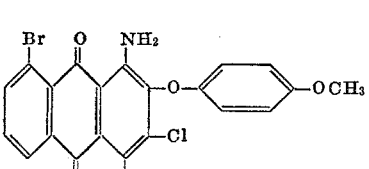 | Do. |
| 84 | 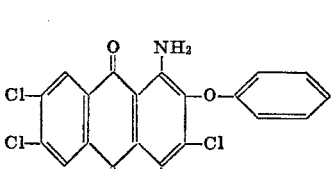 | Do. |
| 85 | 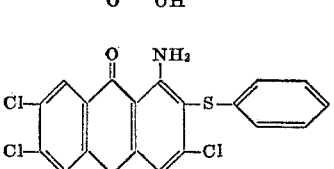 | Reddish violet. |
| 86 | 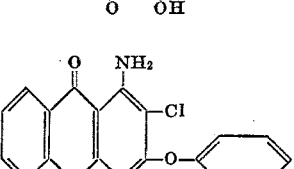 | Bluish red. |
| 87 | 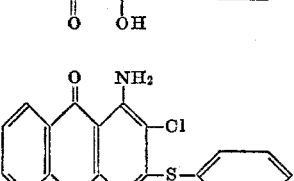 | Do. |

| Ex. No. | Formula of the dye | Shade on polyester fabrics |
|---|---|---|
| 88 | 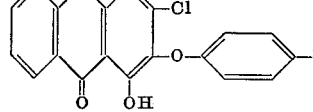 | Bluish red. |
| 89 | 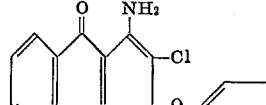 | Do. |
| 90 | 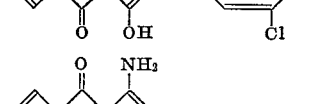 | Do. |
| 91 | 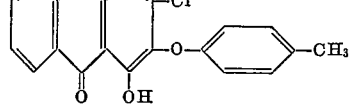 | Do. |
| 92 | 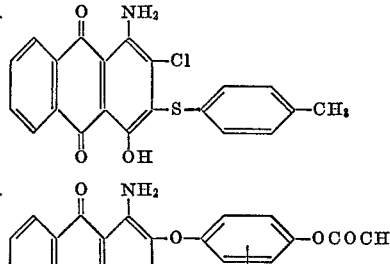 | Do. |
| 93 | 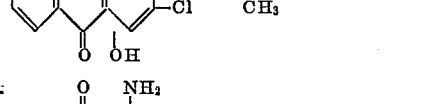 | Do. |
| 94 | 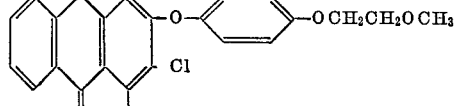 | Do. |
| 95 | 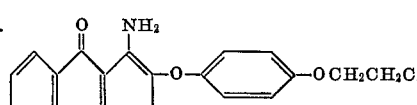 | Do. |

EXAMPLE 96

A mixture of 4 parts of the compound obtained in Example 1, 6 parts of sodium dinaphthylmethane-disulfonate and 20 parts of water was ground in a ball mill for 24 hours to obtain a colloidal liquid, which was spray-dried, whereby 10 parts of a dyeing agent was obtained.

Into 1000 parts of water, 1 part of the dyeing agent and 25 parts of polyester spun yarn (Trademark: Tetoron) were added, and the dye bath was heated gradually. The dyeing was conducted at 130° C. for 60 minutes under a pressure. The dyed product was washed with hot water, successively reduction-washed and dried, whereby a yarn dyed in a brilliant bluish red shade was obtained. The yarn was superior in fastnesses to light, sublimation and washing.

EXAMPLE 97

According to a similar manner to that of Example 96, 4 parts of the compound obtained in Example 2 was treated to obtain 10 parts of a dyeing agent.

Into 1,000 parts of water, 1 part of the dyeing agent, 4 parts of a methylnaphthalene type carrier and 20 parts of polyester spun yarn were added respectively. The dyeing was conducted at 100° C. for 90 minutes. The dyed product was post-treated according to the same manner as in Example 96 to obtain a brilliant bluish red yarn having excellent fastnesses to light, sublimation and washing.

EXAMPLE 98

Into 1,000 parts of water, 15 parts of the compound obtained in Example 3 was dispersed by use of a suitable amount of a dispersing agent, and thereafter polyester cloth was dipped therein. The cloth was squeezed up to 60% of pick up and was dried uniformly by a hot air drier. The pre-dried cloth was treated at 200° C. for 90 minutes by use of a heat-treating machine for thermosol, and thereafter was reduction-washed, washed with water and dried. The dyed product was brilliant bluish red in shade and superior in fastnesses to light and sublimation.

What is claimed is:

1. A compound of the formula,

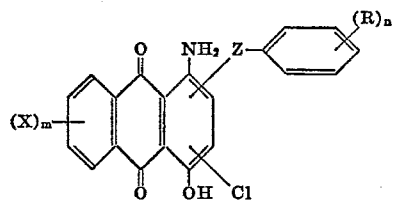

wherein Z is oxygen or sulfur atom, X is hydrogen or a halogen atom, R is hydrogen atom, $C_1$–$C_5$ alkyl, $C_1$–$C_5$ alkyl substituted by a member selected from the group consisting of chlorine, cyano, methoxycarbonyl, ethoxycarbonyl, benzyloxycarbonyl, phenethyloxycarbonyl, phenethyl, benzyl and phthalimidomethyl, or alkoxy, phenylcarbonyl, alkylcarbonyl, alkylmercapto, alkylsulfonyl, phenoxysulfonyl, carboalkoxy, alkylaminosulfonyl, phenylaminosulfonyl, phenyl, nitro or cyano group, or a halogen atom, and m and n are respectively an integer of 1 to 4.

2. The compound of Claim 1 wherein R is methyl.

3. A compound according to Claim 1, wherein —R is a $C_1$–$C_5$ alkyl.

4. A compound according to Claim 1, wherein Z is oxygen atom.

5. A compound according to Claim 2, wherein R is hydrogen or a halogen atom or a lower alkyl group.

6. A compound according to Claim 1, wherein Z is sulfur atom.

7. A compound according to Claim 6, wherein R is hydrogen or a halogen atom, or a lower alkyl group.

8. A compound of the formula,

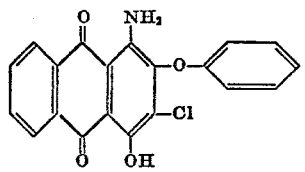

9. A compound of the formula,

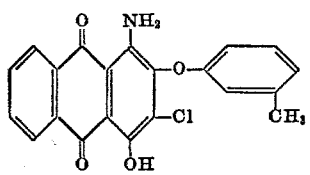

10. A compound of the formula,

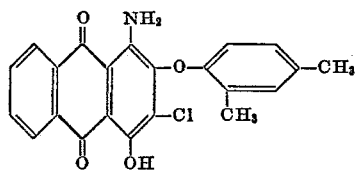

11. A compound of the formula,

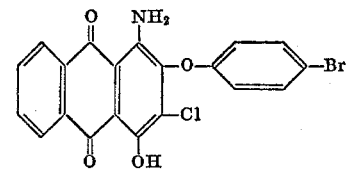

12. A compound of the formula,

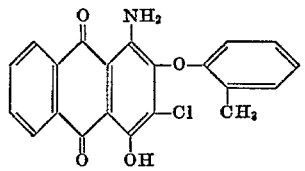

13. A compound of the formula,

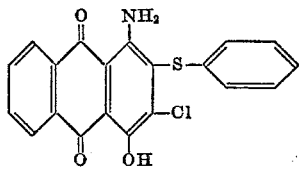

14. A compound of the formula,

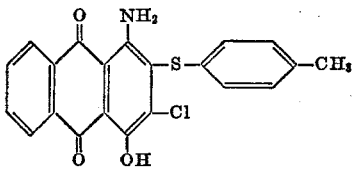

References Cited

UNITED STATES PATENTS 3,557,155   1/1971   Yamada et al. _____ 260—373

FOREIGN PATENTS 1,090,259   11/1967   Great Britain _____ 260—380
10,741   6/1963   Japan _____ 260—380
1,094,503   12/1967   Great Britain _____ 260—381

ROBERT GERSTL, Primary Examiner

U.S. Cl. X.R.

8—39, 40; 260—326 D, 373, 376